Figure 1:
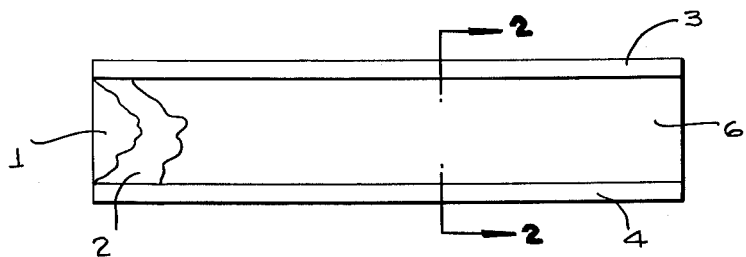

April 19, 1966     L. S. CRAIG     3,247,478
ELECTRICAL HYGROMETER
Filed March 20, 1961

INVENTOR.
LEO S. CRAIG
BY *Hurvitz & Rose*
ATTORNEYS

United States Patent Office 3,247,478
Patented Apr. 19, 1966

3,247,478
ELECTRICAL HYGROMETER
Leo S. Craig, West Long Branch, N.J., assignor to Aerological Research, Inc., Long Branch, N.J.
Filed Mar. 20, 1961, Ser. No. 97,040
7 Claims. (Cl. 338—35)

The present invention relates to apparatus for measuring relative humidity and more particularly to electrical hygrometers.

Electrical hygrometers of the type with which the present invention is concerned usually comprise an insulating base material having a coating whose electrical resistance varies as a function of relative humidity. Wires or electrodes are attached to the device and in operation are connected to a resistance measuring equipment so that the resistance of the resistive coating may be measured. The humidity sensitive material may comprise lithium chloride, carbon or other materials having a resistance which varies as a function of relative humidity.

The prior art apparatus of this type has been found to have relatively poor hysteresis characteristics over a wide dynamic range of temperatures when a carbon coating is employed. The plastic bases employed have a large temperature coefficient of expansion, for instance, polystyrene at $100 \times 10^{-6}$ parts per degree C. Although the plastic has a rapid response time to temperature changes and its dimensions are quickly in equilibrium with ambient temperature, the carbon coating has a slow response time when subjected to large changes in lateral dimensions which introduce hysteresis errors into the humidity readings. This difficulty is not experienced with lithium chloride coatings since these coatings are electrolytic solutions and their resistances are not materially affected by the changes in dimension encountered in these devices. However, carbon coatings, being in the dry or solid state, are sensitive to changes in dimensions and their resistance varies with such changes in dimensions completely independently of changes in relative humidity. For this reason, it would appear that lithium chloride coatings are preferable but many other considerations dictate the utilization of carbon as the sensitive element. Specifically, the resistance of the carbon coating is considerably lower than that of the other material and the range of variation of its resistance with large changes in temperature and relative humidity is relatively small as compared with lithium chloride. The former factor permits ease of measurement while the latter factor permits a single element to be employed over extreme ranges of variation in temperature and relative humidity. The carbon hygrometer has other advantages over lithium chloride units; such as, the carbon element has an exceedingly fast response to changes in humidity, about ten times faster than lithium chloride in a radiosonde, the carbon units are not affected by direct current, the carbon units are more sensitive in the high humidity region, and the carbon element has a positive resistance coefficient of humidity which is important in some applications.

The prior art devices were also found wanting due to the hygroscopic nature of the base material. If the base material is hygroscopic, it is apparent that the dynamic response of the device is affected by changes in relative humidity due to the delay of the base material in giving off and taking up moisture as the quantity of moisture in the air changes.

In accordance with the present invention, there is provided an electrical hygrometer comprising a base material having a low temperature coefficient of expansion of not greater than $25 \times 10^{-6}$ parts per degree C., and low moisture absorptive properties. In the preferred form of the invention, the temperature coefficient of resistance is no greater than $15 \times 10^{-6}$ parts per degree C. Materials providing the necessary characteristics are metals having temperature coefficients as specified above, such as steel and Invar, whose temperature coefficients of expansion are $10 \times 10^{-6}$ and $1 \times 10^{-6}$ parts per degree C. and which are not hygroscopic. Additionally, porcelain with a temperature coefficient of expansion of $3 \times 10^{-6}$ and a low moisture absorption property, and other non-metals with similar properties may be employed.

Since metals are conductors, the base must be coated with an insulating material which may be a plastic, such as polystyrene and methacrylate or other comparable insulating materials. These plastics are more moisture absorptive than the base metal so that the amount of moisture retained in the plastic, if the plastic layer is too thick, may affect the humidity reading particularly at the low values of relative humidity. According to the present invention, the plastic or insulating layer is maintained quite thin, usually being only thick enough to prevent short circuiting of the unit when the metal electrodes are applied. The thickness of the insulating coating should be no thicker than 0.01 inch and usually runs from 0.004 to 0.001 inch in thickness.

The lower limit of thickness of the insulating layer is determined by the method of applying the electrodes. Preferably, the electrodes are applied along the edges of the blank as a conductive paint containing a solvent for the insulating coating so that the paint becomes intimately bonded to the insulator. The insulating layer should be thick enough to prevent the solvent from eating completely through the layer and this consideration limits the thickness of the layer when this technique is employed.

As a final step in assembly of the unit, the carbon layer is applied over the insulating base and extends into contact with the metal electrodes.

The prior art, in the form U.S. Patent No. 2,285,421, issued on June 9, 1942, to Francis W. Dunmore for Humidity Variable Resistor, discloses a metal base electrical hygrometer. In this patent, there is disclosed an aluminum tube coated with an insulator of polystyrene which is subsequently coated with lithium chloride. The patentee states that the aluminum tube is employed to lend rigidity to the device at high temperatures. If a plastic were employed as the base member, it would soften at high temperatures, become distorted and change the resistance characteristics of the lithium chloride coating. At lower temperatures, the metal tube may be eliminated since the patentee considers the metal tube to have no other use in the device than to lend rigidity thereto. However, as pointed out above, the metal tube may not be eliminated from the applicant's invention, regardless of the temperature at which it is employed, since to do so would render the device highly sensitive to the effects of thermal expansion and contraction of the plastic materials employed. Further, the patentee employs an aluminum base, aluminum having a temperature coefficient of expansion of $23 \times 10^{-6}$ parts per degree C. As indicated above, it is preferable not to permit this factor to be greater than $15 \times 10^{-6}$ parts per degree C. Also, the patentee considers polystyrene to be non-hygroscopic and therefore does not place any particular restrictions upon the thickness of the insulating coating. He does state that the coating is preferably about 0.01 inch thick which lies at the extreme end of the range permitted by the present invention and which is well outside of the preferable range.

It is therefore an object of the invention to provide an electrical hydrometer which may be employed over large dynamic ranges of temperature and humidity.

It is another object of the present invention to provide an electrical hygrometer which may be operated over extreme dynamic temperature ranges.

It is another object of the present invention to provide an electrical hygrometer comprising a base member having a low temperature coefficient of expansion and a thin insulating coating thereon and a carbon coating employed as the element whose resistance varies as a function of relative humidity.

It is still another object of the present invention to provide an electrical hygrometer employing a metallic base member having a temperature coefficient of expansion of not greater than $25 \times 10^{-6}$ parts per degree C. and preferably having a temperature coefficient expansion of not greater than $15 \times 10^{-6}$ parts per degree C.

It is yet another object of the present invention to provide an electrical hygrometer having a low temperature coefficient of expansion metallic base and an insulating coating thereon which coating is not greater than 0.01 inch thick and preferably is between 0.001 and 0.004 inch thick.

Figure 2:
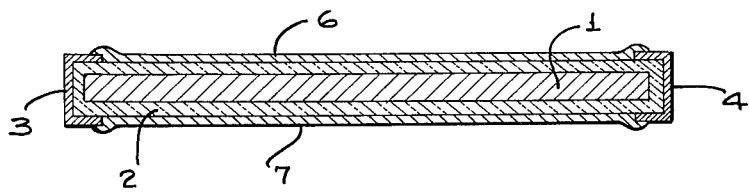
Figure 3:
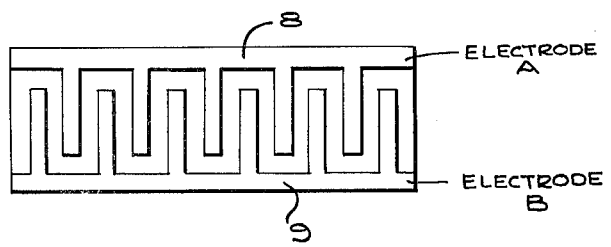

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a top view of one form of the apparatus of the present invention;

FIGURE 2 is a cross-sectional view of a form of the apparatus of the present invention taken along line 2—2 of FIGURE 1; and FIGURE 3 is a top view of a unit of the invention employing an electrode configuration different from that illustrated in FIGURE 1.

Referring now specifically to FIGURES 1 and 2, the apparatus of the present invention may take the form of a thin metal plate 1 having a low temperature coefficient of expansion. The metal blank 1 is completely coated with an insulating material 2 which covers the top and bottom of the plate and the edges thereof also. The metal plate 1 has a generally rectangular cross section as illustrated in FIGURE 2 and a rectangular top and bottom surface as illustrated in FIGURE 1. The longitudinally extending edges of the body have applied thereto metal electrodes 3 and 4 which in the specific embodiment illustrated extend along the top and bottom surfaces of the blank and around the longitudinal edges thereof so as to provide electrode surfaces on both the top and bottom surfaces. Carbon coatings 6 and 7 are applied over the top and bottom surfaces of the blank and extend into engagement with the electrodes 3 and 4.

The embodiment of the invention illustrated in FIGURES 1 and 2 therefore provides relative humidity measuring top and bottom surfaces although it is to be understood that one of these coatings may be eliminated. In such a case, the total resistance of the apparatus is approximately twice that provided by the apparatus illustrated. Because of the specific arrangement of the apparatus illustrated, it is of the nature of a printed circuit panel so that the device may be readily slipped into receiving structures having spring fingers or contacts arranged to engage the metallized conductors or electrodes 3 and 4, thereby eliminating the need for attaching leads to the fabricated device.

In the preferred form of the invention, the metal blank 1 may be about three-hundredths of an inch thick and comprises a material having a temperature coefficient of expansion of not greater than $25 \times 10^{-6}$ parts per degree C. and preferably not more than $15 \times 10^{-6}$ parts per degree C. The metal blank 1 may comprise steel or Invar both of which have extremely low temperature coefficients of expansion. The plastic film 2 may comprise a thermo-setting resin; such as, polystyrene or methacrylate, and may be applied by a dip coating process. The electrodes 3 and 4 are applied as a paint containing a solvent for the plastic material 2. The surface of the plastic becomes partially dissolved and forms an intimate bond with the metallized paint, thereby providing a mechanically strong structure. The carbon coatings 6 and 7 may now be applied by any of the techniques employed with paints such as brushing, dipping, spraying or rolling. A typical solution usually includes a dispersing agent for the carbon, such as alkyl aryl polyether alcohol; the carbonaceous material, powdered carbon; binder, for instance, hydroxyethyl cellulose; a humectant, such as, polyoxyethylene sorbitol; a wetting agent for the particular plastic employed; a diluent, water in this particular solution and an ion exchange resin. As illustrated in the figures, the carbon coating extends across the top and bottom surfaces of the blank and into contact with the electrodes 3 and 4.

The initial resistance of the apparatus is, of course, determined by the carbon content of the coating and may be adjusted to a desirable value. One unit which has been built has an absolute resistance at 33 percent relative humidity and 25° C. of 20,000 ohms whereas another unit which has been built has, under the same conditions of temperature and humidity, a resistance of 550 ohms.

Set forth below is a table of resistance ratio values for the carbon hygrometer illustrated in FIGURE 2 in which all resistances have been standardized to 33 percent relative humidity and +25° C. It will be noted from this table that the resistance ratio values are all "one" under these conditions. Further, although this is not apparent from the table, the value of the resistance is the same for all temperatures, measured at 33 percent relative humidity. It will be noted from this table that the variations in resistance between the lowest temperature and lowest humidity over the range of measurement up to the highest values of temperature and humidity measured is well within the capabilities of the standard resistance measuring apparatus and therefore a single blank fabricated according to techniques of the present invention may be employed over a very wide range of temperatures and relative humidities.

*Table of resistance ratio values for carbon hygrometer*

| Percent RH | R/R33 +40° C. | +25° C. | R/R33 0° C. | R/R33 −20° C. | R/R33 −40° C. | Percent RH |
|---|---|---|---|---|---|---|
| 10 | .75 | .700 | .69 | .66 | .67 | 10 |
| 20 | .86 | .810 | .79 | .77 | .77 | 20 |
| 33 | 1.0 | 1.00 | 1.0 | 1.0 | 1.0 | 33 |
| 40 | 1.2 | 1.175 | 1.2 | 1.3 | 1.5 | 40 |
| 60 | 2.2 | 2.50 | 3.0 | 4.7 | 7.5 | 60 |
| 80 | 8.5 | 10.6 | 16 | 44 | | 80 |
| 95 | 32 | 37.8 | 37 | | | 95 |

If the table is converted to resistance values and the initial resistance is considered to be 20,000 ohms, the range of resistances as illustrated in the table runs from 13,400 ohms to 880,000 ohms which, as indicated immediately above is within the capabilities of standard measuring equipment.

The particular electrode configuration illustrated in FIGURE 1 is not intended to be limiting and other configurations may be employed. Referring to FIGURE 3 of the accompanying drawings, electrodes 8 and 9 constitute interleaved comb-like grids. The carbon coating is applied in this instance as in the prior configuration, by a dip, spray, brush process, etc. over the flat surfaces of the unit.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An electrical hygrometer comprising a metallic base member having a temperature coefficient of expansion of not greater than $15 \times 10^{-6}$ parts per degree C., an insulating coating over said base member of between 0.001 and 0.004 inch thick, a carbon coating on said insulating coating, the resistance of said carbon coating being a function of relative humidity and means for making electrical contact with said carbon coating.

2. An electrical hygrometer comprising a metallic base member having a temperature coefficient of expansion having an upper limit of approximately $10 \times 10^{-6}$ parts per degree C. and low moisture absorptive properties, a layer of insulating material covering said base member and having an upper limit of thickness of 0.01 inch, a carbon coating on said insulating material, the resistance of said carbon coating being a function of relative humidity and means for making electrical contact with said carbon coating.

3. The combination according to claim 2 wherein the thickness of said insulating material is between 0.001 and 0.004 inch.

4. An electrical hygrometer comprising a metallic base member having a temperature coefficient of expansion having an upper limit of approximately $15 \times 10^{-6}$ parts per degree C. and low moisture absorptive properties, a layer of insulating material covering said base member and having an upper limit of thickness of 0.01 inch, a carbon coating on said insulating material, the resistance of said carbon coating being a function of relative humidity and means for making electrical contact with said carbon coating.

5. The combination according to claim 4 wherein the thickness of said insulating material is between 0.001 and 0.004 inch.

6. An electrical hygrometer comprising a base member of steel, a layer of insulating material covering said base member and having an upper limit of thickness of 0.01 inch, a carbon coating on said insulating material, the resistance of said carbon coating being a function of relative humidity and means for making electrical contact with said carbon coating.

7. An electrical hygrometer comprising a base member of Invar, a layer of insulating material covering said base member and having an upper limit of thickness of 0.01 inch, a carbon coating on said insulating material, the resistance of said carbon coating being a function of relative humidity and means for making electrical contact with said carbon coating.

References Cited by the Examiner

UNITED STATES PATENTS

| | | | |
|---|---|---|---|
| 1,422,130 | 7/1922 | Reynolds | 338—308 |
| 1,819,246 | 8/1931 | Jones | 338—309 X |
| 1,881,446 | 10/1932 | Flanzer | 338—309 X |
| 2,179,566 | 11/1339 | Stoekle | 338—162 |
| 2,285,421 | 6/1942 | Dunmore. | |
| 2,481,728 | 9/1949 | Dember | 73—336.5 X |
| 2,701,832 | 2/1955 | Marsden | 73—336.5 X |
| 2,943,488 | 7/1960 | Strobel | 73—336.5 |
| 3,026,398 | 3/1962 | Quirk | 338—308 X |
| 3,045,198 | 7/1962 | Dolan et al. | 338—35 X |
| 3,058,079 | 10/1962 | Jones | 338—35 |

RICHARD M. WOOD, *Primary Examiner.*

I. LISANN, ANTHONY BARTIS, *Examiners.*